(12) United States Patent
Hagen et al.

(10) Patent No.: US 8,931,523 B2
(45) Date of Patent: Jan. 13, 2015

(54) TANK VENTING DEVICE FOR A FUEL TANK OF A VEHICLE, AND METHOD FOR VENTING A FUEL TANK

(75) Inventors: Harald Hagen, Creussen (DE); Andreas Wagner, Ingolstadt (DE)

(73) Assignee: Audi AG, Ingolstadt (DE)

( * ) Notice: Subject to any disclaimer, the term of this patent is extended or adjusted under 35 U.S.C. 154(b) by 714 days.

(21) Appl. No.: 13/112,436

(22) Filed: May 20, 2011

(65) Prior Publication Data

US 2011/0284125 A1   Nov. 24, 2011

(30) Foreign Application Priority Data

May 22, 2010   (DE) .......................... 10 2010 021 353

(51) Int. Cl.
| | | |
|---|---|---|
| *F02M 39/00* | (2006.01) | |
| *F02M 25/08* | (2006.01) | |
| *B60K 15/035* | (2006.01) | |
| *F02M 37/00* | (2006.01) | |
| *B60K 15/03* | (2006.01) | |

(52) U.S. Cl.
CPC ........ *F02M 25/089* (2013.01); *B60K 15/03519* (2013.01); *F02M 37/0076* (2013.01); *B60K 2015/03302* (2013.01); *B60K 2015/03514* (2013.01); *B60K 2015/03576* (2013.01)
USPC ................... 141/7; 141/59; 141/94; 141/198; 141/301; 123/519; 137/587

(58) Field of Classification Search
USPC ............ 123/516, 518, 519; 141/7, 45, 50, 59, 141/94, 198, 301; 137/587
See application file for complete search history.

(56) References Cited

U.S. PATENT DOCUMENTS

| | | | |
|---|---|---|---|
| 4,762,156 A | | 8/1988 | Rich |
| 5,676,116 A | | 10/1997 | Kim |
| 5,692,480 A | * | 12/1997 | Kato et al. ..................... 123/519 |
| 5,819,796 A | * | 10/1998 | Kunimitsu et al. ........... 137/587 |
| 5,850,819 A | * | 12/1998 | Kunimitsu et al. ........... 123/520 |
| 6,289,947 B1 | * | 9/2001 | Heimbrodt et al. ........... 141/128 |
| 6,854,492 B2 | | 2/2005 | Benjey |
| 7,089,920 B2 | | 8/2006 | Nakoji et al. |
| 7,233,845 B2 | * | 6/2007 | Veinotte ........................ 123/520 |
| 8,683,852 B2 | * | 4/2014 | Makino ....................... 73/114.39 |
| 2002/0112703 A1 | | 8/2002 | Fujimoto et al. |

FOREIGN PATENT DOCUMENTS

| | | |
|---|---|---|
| DE | 10 2006 004 630 A1 | 2/1998 |
| DE | 603 04 660 T2 | 2/2007 |
| DE | 102008030196 | 12/2009 |
| JP | 02102822 A | 4/1990 |

\* cited by examiner

*Primary Examiner* — Timothy L Maust
*Assistant Examiner* — Timothy P Kelly
(74) *Attorney, Agent, or Firm* — Henry M. Feiereisen LLC

(57) ABSTRACT

The invention relates to a tank venting system for a fuel tank (12) of a vehicle, having a vent line (14) for discharge of gaseous hydrocarbons from the fuel tank (12) during refueling thereof. Gaseous hydrocarbons originating from the fuel tank (12) can be introduced in a filler pipe (20) of the fuel tank (12) via a recirculation line (24). A control device (34) controls a proportional valve (32) and changes in this way a pass-through cross section of the recirculation line (24). In this way, a load of an activated charcoal filter (16) which is coupled with the vent line (14) can be minimized. The control device (34) can especially determine a pressure in the fuel tank (12). Furthermore, the invention relates to a method of venting a fuel tank (12) during refueling thereof.

7 Claims, 2 Drawing Sheets

TANK VENTING DEVICE FOR A FUEL TANK OF A VEHICLE, AND METHOD FOR VENTING A FUEL TANK

CROSS-REFERENCES TO RELATED APPLICATIONS

This application claims the priority of German Patent Application, Serial No. 10 2010 021 353.5, filed May 22, 2010, pursuant to 35 U.S.C. 119(a)-(d).

BACKGROUND OF THE INVENTION

The invention relates to a tank venting system for a fuel tank of a vehicle, having a vent line for discharge of gaseous hydrocarbons from the fuel tank during refueling thereof. Gaseous hydrocarbons originating from the fuel tank can be introduced in a filler pipe of the fuel tank via a recirculation line. The tank venting system includes in addition a valve for changing a pass-through cross section of the recirculation line, and a filter for absorbing gaseous hydrocarbons via the vent line. The invention further relates to a method of venting a fuel tank of a vehicle during refueling thereof.

U.S. Pat. No. 4,762,156 A describes a tank venting system with a vent line to connect a fuel tank with an activated charcoal filter. When the fuel tank is filled with fuel via a filler pipe, gaseous hydrocarbons are displaced from the fuel tank and are routed via the vent line into the activated charcoal filter where they are collected. A fraction of the fuel vapors are however returned via a recirculation line back into the filler pipe to reduce the exposure of the activated charcoal filter to fuel vapors. Arranged in the recirculation line is a valve in which a spring imposes forces on a diaphragm so as to keep the valve closed. The spring is accommodated in a space of the valve which space is in communication with the filler pipe via the recirculation line. As a result of a negative pressure in the filler pipe, caused by incoming fuel into the filler pipe, also the space in the valve is subject to a pressure below the atmospheric pressure and the valve opens. An opening width of the valve increases hereby with increase in the negative pressure in the filler pipe. This negative pressure is especially high when a particularly large amount of fuel flows through the filler pipe. When the negative pressure in the filler pipe is low, i.e. when the volume flow of fuel through the filler pipe is small, the valve opens only when the negative pressure is able to overcome the force of the spring. In this way, escape of fuel vapors to the outside via the filler pipe should be prevented when the volume flow is small.

Such a tank venting system is disadvantageous because an unwanted escape of gaseous hydrocarbons from the tank venting system can still be encountered.

SUMMARY OF THE INVENTION

It is therefore an object of the present invention to provide a tank venting system of the afore-mentioned type and a method of venting a fuel tank, which substantially prevent an escape of hydrocarbons from the tank venting system to the outside.

According to one aspect of the invention, the object is attained by a tank venting system for a fuel tank of a vehicle, including a vent line for discharge of gaseous hydrocarbons from the fuel tank during refueling thereof, a recirculation line via which gaseous hydrocarbons originating from the fuel tank can be introduced into a filler pipe of the fuel tank, a valve for changing a pass-through cross section of the recirculation line, a filter for absorbing gaseous hydrocarbons via the vent line, and a control device for adjusting an opening width of the valve, in particular in dependence of a load of the filter (16) with gaseous hydrocarbons.

According to another aspect of the present invention, the object is attained by a method of venting a fuel tank during refueling thereof, wherein gaseous hydrocarbons displaced from the fuel tank are carried off via a vent line, wherein at least a fraction of the gaseous hydrocarbons originating from the fuel tank is introduced via a recirculation line into a filler pipe of the fuel tank, wherein a valve changes a pass-through cross section of the recirculation line, wherein a load of a filter, coupled with the vent line, with gaseous hydrocarbons is taken into account when changing the opening width of the valve.

Advantageous embodiments with appropriate refinements of the invention are set forth in the dependent patent claims.

The tank venting system according to the invention includes a control device for adjusting an opening width of the valve. Thus, there is no mechanical coupling of the opening width of the valve to the negative pressure prevailing in the filler pipe during refueling of the fuel tank. Rather, the opening width can be adjusted in a desired manner in dependence on predetermined variables and thus like for a specific application. In particular, the opening width of the valve can be adjusted in dependence on a load of the filter with gaseous hydrocarbons. This ensures that the filter is not loaded to an undesired degree with gaseous hydrocarbons that could lead to an escape of gaseous hydrocarbons from the filter.

It is thus possible to use a filter of especially high efficiency because of its capability to absorb gaseous hydrocarbons in an especially good manner. Moreover, escape of fuel vapors from the filler pipe to the outside during refueling is reliably prevented. At the same time, the load of the filter with gaseous hydrocarbons can be kept especially slight.

The use of a high-performance filter, accompanied with a high resistance pressure in the vent line, is especially beneficial with respect to absorbing fuel vapors in the tank venting system because a high pressure in the fuel tank renders a further transformation from hydrocarbons into the gas phase difficult. As the control device also permits adjustment of a great opening width of the valve when the resistance pressure of the filter is high, it is possible to obtain a volume flow through the filter which is smaller and thus free of gaseous hydrocarbons, even when a high-performance filter is involved.

According to an advantageous configuration of the invention, the control device is coupled with a sensor for determining a pressure in the fuel tank. This is based on the recognition that only a small pressure in the fuel tank is present when refueling a comparably small volume flow. When the volume flow of fuel through the filler pipe is small, only a small negative pressure is encountered in the area of the fuel nozzle as a result of the slight Venturi effect. To prevent an escape of gaseous hydrocarbons, migrating in this case via the recirculation line into the filler pipe, to the outside from the filler pipe, the valve is closed especially wide, in particular completely, in the presence of a small pressure in the fuel tank.

In contrast thereto, a high volume flow of fuel in the filler pipe results in a high negative pressure in the area of the fuel nozzle and in a high pressure of the gaseous hydrocarbons in the fuel tank. In this case, it is beneficial to have the control device adjust an especially large opening width of the valve so that a large proportion of the gaseous hydrocarbons is recirculated. This minimizes exposure of the filter to gaseous hydrocarbons. Furthermore, this effectively prevents the presence of a pressure in the fuel tank high enough to automatically switch-off the fuel nozzle, i.e. to stop a further fuel flow through the fuel nozzle.

In addition or as an alternative, the control device may be coupled with a sensor for determining a degree of saturation of the filter with gaseous hydrocarbons. In this way, excess strain of the filter to cause the filter to no longer be able to absorb gaseous hydrocarbons which thus can pass through can be reliably prevented. The load of the filter can thus be ascertained using the pressure in the fuel tank by determining the exposure of the filter to gaseous hydrocarbons flowing to it, and in addition or as an alternative to ascertain the degree of saturation, i.e. the amount of gaseous hydrocarbons already absorbed in the filter.

The opening width of the valve can be adjusted in a particularly simple and easy manner by storing in a memory at least one characteristic line which reflects the dependence of the opening width of the valve as a function of a variable commensurate with the load of the filter. Such variables may involve the pressure in the fuel tank and/or the degree of saturation of the filter.

According to a further advantageous configuration of the invention, the control device is constructed to regulate the opening width of the valve. This ensures in particular that a desired load of the filter is observed, even when encountering adverse impacts. In particular, dynamic changes can thus be especially well taken into account. The regulation is preferably based upon a predetermined value for a variable commensurate with the load of the filter.

It has been further shown as advantageous when the tank venting system includes a bypass line for bypassing the valve. In this way, tests can be run, when the valve is closed, to check for leakage at another location of the tank venting system, for example in the area of a tank cap closing the filler pipe.

Finally, it has been shown advantageous, when the valve is configured as electromagnetic proportional valve which is closed when not electrically excited. This ensures that no undesired fuel vapors are able to escape to the outside via the recirculation line in the event of failure of the valve.

In the method according to the invention for venting a fuel tank of a vehicle during refueling of the fuel tank, gaseous hydrocarbons displaced from the fuel tank are carried away via a vent line. At least a fraction of the gaseous hydrocarbons originating from the fuel tank is introduced via a recirculation line into a filler pipe of the fuel tank. Using a valve, a pass-through cross section of the recirculation line can be changed. When changing the opening width of the valve, a load of a filter, coupled with the vent line, with gaseous hydrocarbons is taken into account. As a result, escape of hydrocarbons from the tank venting system can be substantially avoided.

The advantages described for the tank venting system according to the invention and preferred embodiments are also applicable for the method according to the invention for venting a fuel tank.

The features and feature combinations set forth in the preceding description as well as the following features and feature combinations set forth in the figure description and/or shown by themselves in the figures are applicable not only in the respectively indicated combination but also in other combinations or taken alone, without departing the scope of the invention.

BRIEF DESCRIPTION OF THE DRAWING

Further advantages, features, and details of the invention are set forth in the claims, the following description of preferred embodiments as well as with reference to the drawings. It is shown in:

DETAILED DESCRIPTION OF PREFERRED EMBODIMENTS

Figure 1:
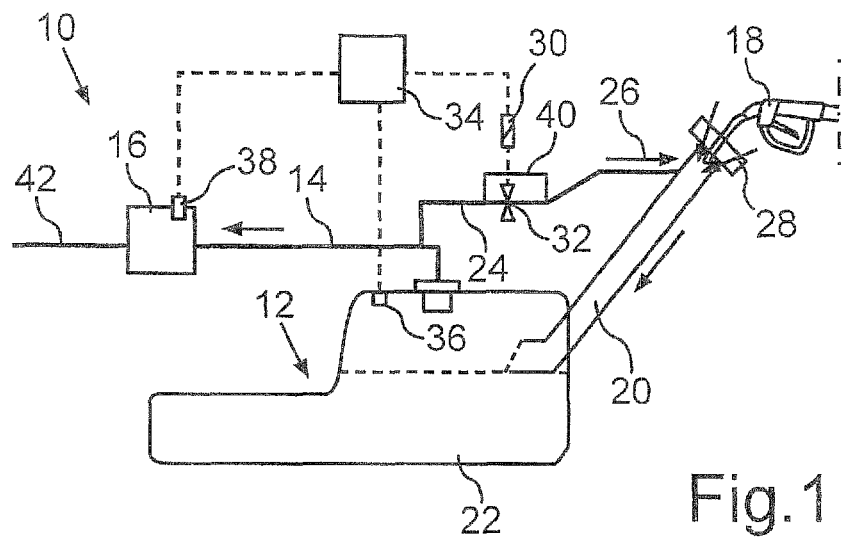
FIG. 1 schematically a tank venting system for a fuel tank of a vehicle.

A tank venting system 10 for a fuel tank 12 of a vehicle includes a vent line 14 which leads from the fuel tank 12 to an activated charcoal filter 16. When fuel flows from a fuel nozzle 16 via a filler pipe 20 into the fuel tank 12, gaseous hydrocarbons, which are present above the fuel 22, are displaced from the fuel tank 12. To prevent the activated charcoal filter 16 from being saturated with gaseous hydrocarbons too rapidly, a fraction of the fuel vapors is recirculated via a recirculation line 24 which branches off from the vent line 14 and feeds into the filler pipe 20.

A stream of gaseous hydrocarbons, illustrated by a flow arrow 26, through the recirculation line 24 is realized by a negative pressure generated in the area of the fuel nozzle 18 by fuel flowing into the filler pipe 20 via the fuel nozzle 18. This negative pressure causes ingress of ambient air 28 into the filler pipe 20, as also indicated in FIG. 1 by flow arrows.

Arranged in the recirculation line 24 is a proportional valve 32 which can be actuated by an electromagnet 30. The proportional valve 32 renders adjustment of the pass-through cross section of the recirculation line 24 possible. When the filling rate is low so that only little amounts of fuel is introduced via the fuel nozzle 18 into the filler pipe, a particularly small pass-through cross section of the recirculation line 24 is adjusted. In particular, the proportional valve 32 is fully closed by no longer applying electric current to the electromagnet. This prevents escape of recirculated gaseous hydrocarbons via the filler pipe 20 to the outside. When the filling rate is high, a large opening width of the proportional valve 32 enables entry of much gaseous hydrocarbons via the recirculation line 24 again into the filler pipe 20 so that comparably small amounts of gaseous hydrocarbons strain the activated charcoal filer 16.

The opening width of the proportional valve 32 is adjusted by a control device 34 which in particular assumes in addition the function of an engine controller of the vehicle. The control device 34 is coupled with a pressure sensor 36 which determines the pressure within the fuel tank 12 above the liquid fuel 22. This ensures a recirculation of an especially large amount of fuel vapors when the filling rate is high and accompanied by a high pressure in the fuel tank 12. As a result, the degree of saturation of the activated carbon filter 16 with gaseous hydrocarbons can be minimized.

According to an embodiment of the tank venting system 10, the control device 34 may be coupled in addition with a further sensor 38 which determines the degree of saturation of the activated carbon filter 16 with gaseous hydrocarbons. In this way, gaseous hydrocarbons are especially effectively prevented from passing through the activated carbon filter 16.

An (optional) bypass, which has an especially small pass-through cross section compared to the recirculation line 24, circumvents the proportional valve 32. This ensures that gaseous hydrocarbons are able to flow through the recirculation line 24, even when the proportional valve 32 is fully closed. When checking the tank venting system 10 for leakage, the tank venting system 10 is acted upon by a positive pressure or a negative pressure via an outlet 42 connected to the activated carbon filter 16. As a result, it can be detected whether a (not shown) tank cap is placed upon the filler pipe 20 or whether the tank cap has the required tightness. In the absence of the bypass 40, the tightness in the tank venting system 10 can be determined only up to the proportional valve 32 but not the tightness of the tank cap or its absence.

Figure 2:
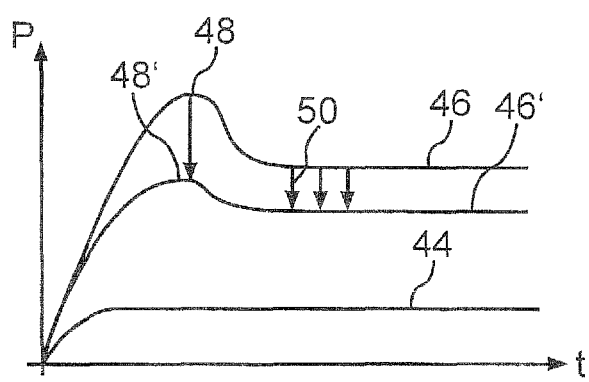
FIG. 2 graphical illustrations of exemplary time characteristics of refueling pressures at different filling rates during refueling of the fuel tank with fuel.

FIG. 2 shows the pressure P in the fuel tank 12 as a function of the time t at varying filling rates. A first curve 44 illustrates the pressure at a low filing rate in which the control device 34 operates the proportional valve 32 in such a way that the recirculation line 24 has a comparable small pass-through cross section.

A further curve 46 describes the theoretic pressure profile at a high filling rate and also comparably small opening width of the proportional valve 32. In this case, a pressure peak 48 is encountered after a short refueling time in the fuel tank 12. The pressure peak 48 is caused especially by the presence of a comparably large bubble formation when fuel is introduced rapidly and in great amounts into the fuel tank 12. Moreover, operation of the fuel nozzle 18 is oftentimes accompanied by a pressure surge at the start of the refueling operation. The unwanted pressure peak 48, which is now preventable by adjusting a greater opening width of the proportional valve 32, can cause a switch-off of the fuel nozzle 18.

Thus, when a high filing rate is involved and the aforedescribed proportional valve 32 is used to greatly increase the pass-through cross section of the recirculation line 24 so that a large amount of gaseous fuel is recirculated, the pressure peak 48' is significantly lower compared to a small passthrough cross section of the proportional valve 32.

Even when the pressure P in the fuel tank 12 has reached a substantially constant level after extended filling time, this pressure P, as illustrated by curve 46', is smaller than when the opening width of the proportional valve 32 is small. A pressure drop 50 attained by increasing the opening width of the proportional valve 32 and accompanied by less strain of the activated charcoal filter 16, is illustrated in FIG. 2 by arrows.

Figure 3:
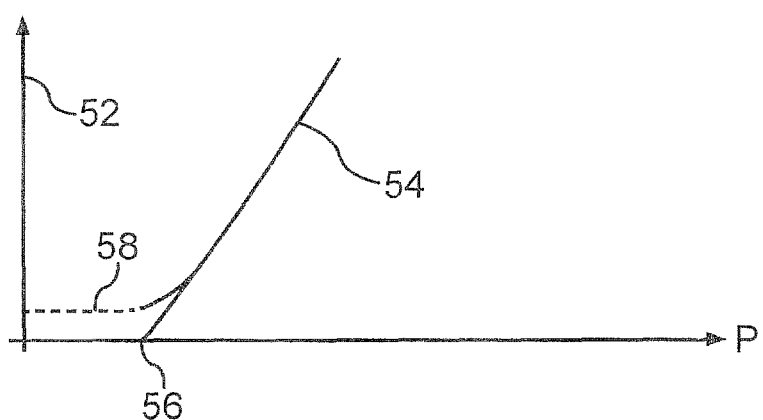
FIG. 3 examples for a characteristic line of a proportional valve arranged in a recirculation line of the tank venting system.

FIG. 3 shows on an abscissa 52 the opening width of the proportional valve 32 and on an ordinate the pressure P in the fuel tank 12. A characteristic line 54 of the proportional valve 32 describes the substantially linear correlation of the opening width of the proportional valve 32 and the pressure P at a higher pressure P. The characteristic line 54 is shown hereby for a proportional valve 32 which has an opening width of greater zero only when exceeding a limit pressure 56.

The diagram in FIG. 3 illustrates also the impact of the bypass 40 upon the volume flow of the recirculated fuel vapors. The bypass 40 ensures the presence of a pass-through minimum cross section 58 even when the limit pressure 56 is undershot in order to return gaseous hydrocarbons back into the filler pipe 20 via the recirculation line 24.

The invention claimed is:

1. A tank venting system for a fuel tank of a vehicle, comprising:
    a vent line connected to the fuel tank for discharge of gaseous hydrocarbons from the fuel tank during refueling thereof;
    a recirculation line branching off from the vent line and connected with a filler pipe of the fuel tank for conducting gaseous hydrocarbons originating from the fuel tank into the filler pipe of the fuel tank;
    a valve arranged in the recirculation line for changing a pass-through cross section of the recirculation line;
    a filter connected with the vent line for absorbing gaseous hydrocarbons via the vent line;
    a first sensor for determining a pressure in the fuel tank;
    a second sensor for determining a degree of saturation of the filter with gaseous hydrocarbons; and
    a control device coupled with the first sensor and with the second sensor and regulating the valve during the refueling so as to change the pass-through cross section of the recirculation line as a function of the degree of saturation of the filter with gaseous hydrocarbons and/or the pressure in the fuel tank, and so as to close the valve when the pressure in the fuel tank falls below a predetermined pressure.

2. The tank venting system of claim 1, further comprising a memory connected with the control device for storing at least one characteristic line to reflect a dependence of the opening width of the valve from a variable commensurate with the load of the filter.

3. The tank venting system of claim 1, wherein the control device is configured to regulate the opening width of the valve.

4. The tank venting system of claim 1, wherein the control device is configured to regulate the opening width of the valve to a predetermined value for a variable commensurate with the load of the filter.

5. The tank venting system of claim 1, further comprising a bypass line connected with the recirculation line for bypassing the valve.

6. The tank venting system of claim 1, wherein the valve is configured as electromagnetic proportional valve which is closed in the absence of electrical excitation.

7. A method of venting a fuel tank during refueling thereof comprising the steps of:
    carrying off gaseous hydrocarbons displaced from the fuel tank via a vent line connected to the fuel tank;
    introducing at least a fraction of the gaseous hydrocarbons originating from the fuel tank via a recirculation line connected with a filler pipe of the fuel tank into the filler pipe of the fuel tank, said recirculation line branching off from the vent line;
    changing a pass-through cross section of the recirculation line by a valve arranged in the recirculation line;
    considering a load of a filter, coupled with the vent line, with gaseous hydrocarbons when changing an opening width of the valve;
    determining a pressure in the fuel tank by a first sensor;
    determining a degree of saturation of the filter with gaseous hydrocarbons by a second filter; and
    regulating with a control device coupled to the first and second sensors the valve during the refueling so as to change the pass-through cross section of the recirculation line as a function of the degree of saturation of the filter with gaseous hydrocarbons and/or the pressure in the fuel tank, and so as to close the valve when the pressure in the fuel tank falls below a predetermined pressure.

* * * * *